United States Patent
Jeon et al.

(10) Patent No.: US 10,636,267 B2
(45) Date of Patent: *Apr. 28, 2020

(54) RFID TAG TRACKING SYSTEMS AND METHODS IN IDENTIFYING SUSPICIOUS ACTIVITIES

(71) Applicant: Walmart Apollo, LLC, Bentonville, AR (US)

(72) Inventors: Steve P. Jeon, Bentonville, AR (US); Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/679,615

(22) Filed: Nov. 11, 2019

(65) Prior Publication Data

US 2020/0082692 A1    Mar. 12, 2020

Related U.S. Application Data

(63) Continuation of application No. 16/000,034, filed on Jun. 5, 2018, now Pat. No. 10,479,239.

(Continued)

(51) Int. Cl.
*G06Q 10/08* (2012.01)
*G08B 13/24* (2006.01)
(Continued)

(52) U.S. Cl.
CPC ..... *G08B 13/2462* (2013.01); *G06K 7/10475* (2013.01); *G08B 13/19645* (2013.01);
(Continued)

(58) Field of Classification Search
None
See application file for complete search history.

(56) References Cited

U.S. PATENT DOCUMENTS 5,712,830 A    1/1998  Ross
6,614,348 B2   9/2003  Ciccolo
(Continued)

OTHER PUBLICATIONS

E-Thele SQD Networks; "360 degree retail surveillance & loss prevention video", https://www.youtube.com/watch?v=NgELfYPnMvQ, published on Jul. 29, 2013, pp. 1-5.
(Continued)

*Primary Examiner* — Brent Swarthout
(74) *Attorney, Agent, or Firm* — Fitch, Even, Tabin & Flannery LLP (57) ABSTRACT

Some embodiments provide retail systems to detect suspicious movement patterns within a retail shopping facility, comprising: an array of camera systems, an array of RFID readers, and a shopping facility evaluation system configured to: receive RFID tag read information from RFID readers of a first RFID tag of a consumer item of a first product; access and apply a first set of rules to identify a first pattern of movement of the first RFID tag; access a set of historic movement patterns specific to the first product; cause an RFID reader to trigger the RFID tag to transition to a state to emit RFID tag information more frequently; access and apply a second set of rules identifying when the first pattern of movement corresponds with a historic movement pattern; and cause a notification to be communicated to a central evaluation system.

20 Claims, 3 Drawing Sheets

Related U.S. Application Data (60) Provisional application No. 62/515,659, filed on Jun. 6, 2017.

(51) Int. Cl.
  *G08B 21/02* (2006.01)
  *G06K 7/10* (2006.01)
  *G08B 13/196* (2006.01)
  *G06K 19/07* (2006.01)
  *E05B 73/00* (2006.01)

(52) U.S. Cl.
  CPC ..... *G08B 13/2402* (2013.01); *G08B 21/0275* (2013.01); *E05B 73/0017* (2013.01); *G06K 19/0723* (2013.01)

(56) References Cited

U.S. PATENT DOCUMENTS

| | | | |
|---|---|---|---|
| 8,013,729 B2 | 9/2011 | Buehler | |
| 8,457,354 B1 | 6/2013 | Kolar | |
| 1,018,612 A1 | 1/2019 | Turgeon | |
| 10,186,125 B2* | 1/2019 | Turgeon | G08B 13/2405 |
| 1,049,723 A1 | 12/2019 | Jeon | |
| 2003/0107650 A1 | 6/2003 | Colmenarez | |
| 2003/0222762 A1 | 12/2003 | Beigl | |
| 2009/0045955 A1 | 2/2009 | Ulrich | |
| 2011/0072132 A1* | 3/2011 | Shafer | G08B 13/2402 |
| | | | 709/224 |
| 2011/0316697 A1 | 12/2011 | Krahnstoever | |
| 2012/0320199 A1 | 12/2012 | Kundu | |
| 2013/0226539 A1* | 8/2013 | Shaw | G06F 17/5009 |
| | | | 703/2 |
| 2014/0363059 A1 | 12/2014 | Hurewitz | |
| 2015/0269818 A1 | 9/2015 | Jain | |
| 2016/0253885 A1* | 9/2016 | Nassar | G06F 16/9537 |
| | | | 340/572.1 |
| 2019/0080280 A1* | 3/2019 | Tingler | G06Q 10/087 |

OTHER PUBLICATIONS

Nanalyze; "Shoptlifting Prevention Technologies for Retailers"; https://www.nanalyze.com/2019/05/ shoplifting-prevention-technologies-retailers/; May 21, 2019; pp. 1-9.

PCT; App. No. PCT/US2018/035785; International Search Report and Written Opinion dated Aug. 31, 2018.

Swedberg, Claire; "Checkpoint Offers RTLS Solutions for High-Value Retail Goods"; RFID Journal; https://www.rfidjournal.com/articles/view?13037; May 13, 2015; pp. 1-5.

USPTO; U.S. Appl. No. 16/000,034; Notice of Allowance dated Apr. 16, 2019.

Zebra Technologies; "Item-Level RFID Tagging and the Intelligent Apparel Supply Chain"; https://www.zebra.com/content/dam/zebra_new_ia/en-us/solutions-verticals/product/RFID/General/White%20Papers/WP_Item-Level_Supply_Chain_0413.pdf; 2015; pp. 1-14.

* cited by examiner

RFID TAG TRACKING SYSTEMS AND METHODS IN IDENTIFYING SUSPICIOUS ACTIVITIES

CROSS-REFERENCE TO RELATED APPLICATION

This application is a continuation of U.S. application Ser. No. 16/000,034 filed Jun. 5, 2018, which claims the benefit of U.S. Provisional Application No. 62/515,659, filed Jun. 6, 2017, each of which is incorporated herein by reference in its entirety.

TECHNICAL FIELD

This invention relates generally to tracking radio frequency identification (RFID) tag movements.

BACKGROUND

Retail stores are continually vulnerable to and subject to theft and the threat of theft of consumer items. People continue to take actions in attempts to avoid being caught while stealing consumer items from retail stores. Accordingly, there is a need to improve the detection of theft of consumer items from a retail store.

BRIEF DESCRIPTION OF THE DRAWINGS

Disclosed herein are embodiments of systems, apparatuses and methods pertaining detecting movement behaviors in a retail shopping facility. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to detect potentially suspicious customer activity within a retail shopping facility and track the activity in confirming whether there is reason for concern regarding the customer's activities. In some embodiments, a retail product pattern tracking system is provided that detects suspicious movement patterns within a retail shopping facility. The tracking system can be implemented at one or more retail facilities, and at each of multiple different shopping facilities includes an array of multiple camera systems, an array of multiple radio frequency identification (RFID) readers, and a shopping facility evaluation system. The shopping facility evaluation system is communicatively coupled with a database that maintains numerous historic movement patterns relative to at least that specific shopping facility, and in some instances other shopping facilities. The evaluation system receives RFID tag read information from two or more of the RFID readers of a particular RFID tag that is exclusively associated with a particular consumer item, which is a first type of product, of numerous different RFID tags each exclusively associated with different consumer items that are within the shopping facility and offered for sale directly to customers at the shopping facility. In some embodiments, the evaluation system accesses one or more sets of rules that are applied to identify movement patterns of consumer items, and uses one or more sets of rules to identify a first pattern of movement of the first RFID tag as the first RFID tag is moved through at least a portion of the shopping facility. The evaluation system further accesses, within the database of historic movement patterns, a set of at least one historic movement patterns specific to the first product and each defining a pattern of movement corresponding to known suspicious activity. A second set of rules that are applied to evaluate movement patterns are further accessed and used by the evaluation system to identify when the first pattern of movement corresponds within threshold variations with a first historic movement pattern of the set of at least one historic movement patterns. The evaluation system can cause a notification to be communicated to a central evaluation system when the first pattern of movement of the first consumer item is consistent with the first historic movement pattern.

The system utilizes RFID readers to accurately identify consumer items from a distance. The use of RFID tags to detect movement patterns provides enhanced tracking capabilities and precise identification of the consumer item being subjected to suspicious activity. Further, the use of the RFID tags allows the system to use potential suspicious movement patterns specific to the particular type of product and/or the particular consumer item. Still further, the use of the RFID tags greatly enhances the identification of potential suspicious activity because, in part, the considered suspicious patterns can correspond with a particular origin of a particular item within the shopping facilities. Previous tracking systems cannot reliably and accurately identify a particular consumer item associated with potentially suspicious activities. Video processing and/or viewing by a person often cannot provide an accurate identification of a consumer item potentially being the subject of suspicious activity, and typically cannot provide accurate real-time or near real-time analysis. Typically, video processing is performed after a detected theft, typically hours if not days later. Often in such post-processing there is not sufficient data to accurately identify a particular time or even an accurate window of time of when the theft occurred. Accordingly, the detection of suspicious activities has been inaccurate, significantly less reliable, and often results in a failure to detect suspicious activities by a customer as well as greater numbers of false or incorrect identifications of instances of activity considered to be suspicious. Further, the video processing provides limited capabilities to evaluate potential activity. The utilization of RFID tracking, however, allows the system to simultaneously track thousands if not tens of thousands of consumer items, and detect potential suspicious activity in real-time as the activity is taking place.

Figure 1:
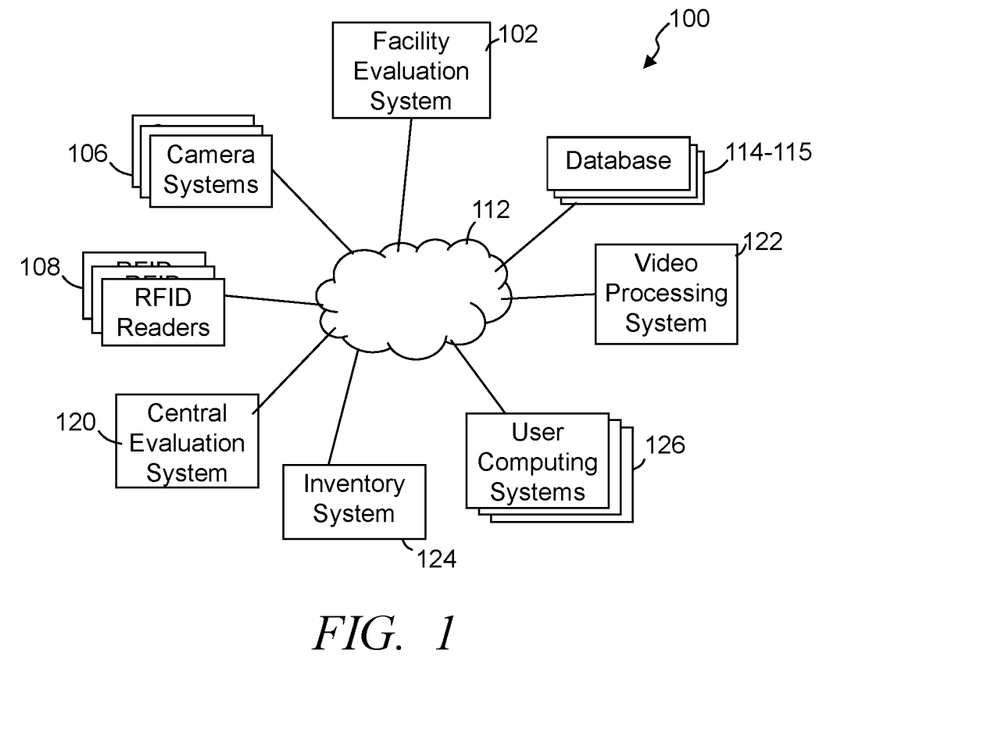
FIG. 1 illustrates a simplified block diagram of an exemplary retail product pattern tracking system, in accordance with some embodiments.
Figure 2:
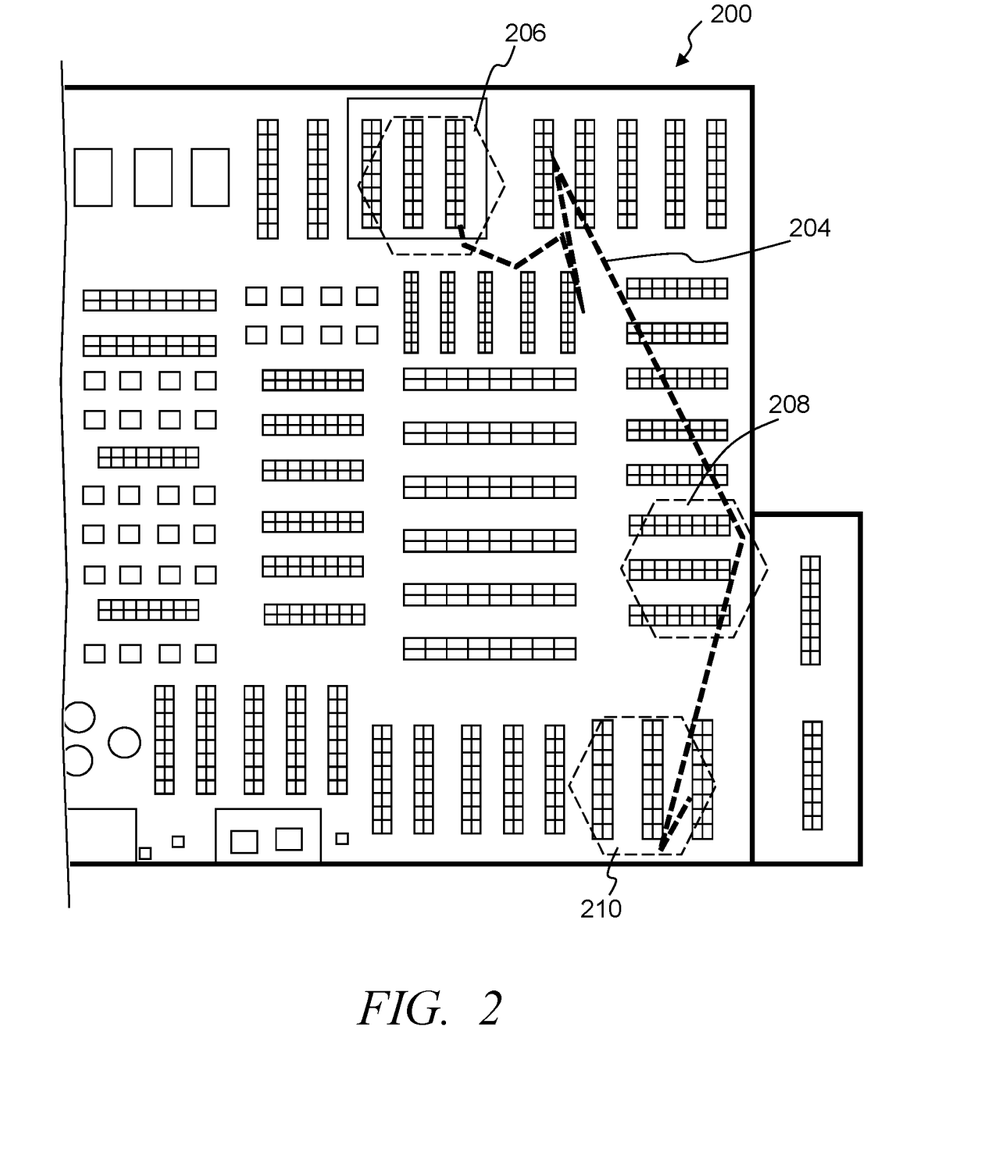
FIG. 2 illustrates a simplified overhead view of a portion of an exemplary retail shopping facility, in accordance with some embodiments.

FIG. 1 illustrates a simplified block diagram of an exemplary retail product pattern tracking system 100, in accordance with some embodiments. FIG. 2 illustrates a simplified overhead view of a portion of an exemplary retail shopping facility 200, in accordance with some embodiments. Referring to FIGS. 1-2, the pattern tracking system 100 includes one or more retail facility evaluation systems 102 communicatively coupled over one or more communication and/or computer networks 112 with an array of camera systems 106 distributed throughout one or more areas of a retail shopping facility 200, and an array of radio frequency identifier (RFID) readers 108 distributed through the shopping facility 200. Each of the one or more evaluation systems 102 includes one or more evaluation control circuits, which may be implemented in part through one or more processors. In some embodiments, the facility evaluation systems include machine learning processing that can evaluate received data over time to increase its ability to more accurate track and identify suspicious activity. Further, the one or more facility evaluation systems 102 include and/or are communicatively coupled with one or more databases 114-115.

The databases include at least a historic movement patterns database 114 maintaining historic movement patterns through the shopping facility, where at least some of those historic movement patterns each correspond with movements of an item through the retail facility as part of suspicious activity (e.g., a process of a person stealing the item, consuming the item within the retail facility, damaging an item, or otherwise misappropriating the item). In some implementations, the database of historic movement patterns 114 includes multiple different sets of historic movement patterns. These sets of historic movement patterns may be organized based on a type of product, an origin of movement of an item, areas of the shopping facility, or other such organizational parameters. For example, each of a plurality of sets of historic movement patterns may each be specific to a type of product. Further, at least some of the historic movement patterns each define a pattern of movement of one or more items corresponding to known suspicious activity. The historic movement patterns may be determined by a central evaluation system 120 that processes past and historic RFID tag movements and/or product movements through the shopping facility and/or other shopping facilities. In some applications, the central evaluation system is a machine learning system that can improve over time its abilities to identify historic and/or real-time suspicious activities. Other databases may include but are not limited to RFID tag databases 115 maintaining RFID tag identifier information and corresponding consumer item identifying information, inventory database maintaining inventory information (e.g., quantities, locations within the retail facility, quantities of ordered items, threshold limits of items, other such information, or combination of two or more of such information), retail facility mapping information database, other such databases, and typically a combination of two or more of such databases. The databases may be fully or partially maintained in independent memory storage systems, fully or partially maintained as part of the facility evaluation system 102, fully or partially maintained as part of the central evaluation system 120, fully or partially maintained as part of the inventory system, fully or partially maintained and distributed across two or more of the user computing systems 126, other such computer memory or a combination of such memory systems. The user computing systems can be substantially any relevant computing system (e.g., desktop computer, laptop computer, smartphone, tablet, wearable smart device, other such systems, or combination of two or more of such systems) that a shopping facility worker, a evaluator worker, a customer, or other relevant person can use to access relevant information, including pattern tracking information, RFID patterns of movement, historic patterns of movement, etc.

In some embodiments, the facility evaluation system 102 is further in communication with the central evaluation system and/or center 120. Typically, the central evaluation system 120 is in communication with multiple facility evaluation systems 102 at multiple different shopping facilities over one or more of the communication and/or computer networks 112. In some implementations, the central evaluation system is operated at a single location, while in other instances the central evaluation system is distributed across multiple different locations communicatively coupled over the distributed network 112. Information about tracked patterns of items within the retail shopping facilities may be communicated by the facility evaluation system 102 to be processed to identify and/or confirm suspicious movement of one or more items within the shopping facility. In some embodiments, video content can be accumulated of the potential suspicious activity. Further, this video content may be communicated to the central evaluation system 120 to be processed and/or evaluated.

The pattern tracking system 100 typically further includes one or more image and/or video processing systems 122. These video processing systems are configured to process images and/or video content to at least in part identify an "object", within the image and/or video content captured by the camera systems 106, that corresponds to a person transporting an item through the shopping facility. The image processing system operates in cooperation with or is implemented as part of the facility evaluation system 102, and receive location and/or movement information based on movement information obtained from tracking the RFID tag associated with that item. This movement information is used by the video processing system to more accurately identify the object transporting the item within the video content. The facility evaluation system may further communicatively couple with an inventory system 124 and/or inventory database to obtain identifying information about an item based on RFID tag data, notify the inventory system of stolen items, and other such communications.

The RFID readers 108 are positioned throughout one or more areas of the shopping facility to detect in real-time RFID tags that are exclusively associated with a single retail item, shopping cart, pallet, pallet rack and other RFID tags that may be used in the shopping facility. The RFID readers can be positioned in substantially any location in the shopping facility to provide desired read coverage over the shopping facility. In some applications, many of the RFID readers 108 are mounted in the ceiling of the shopping facility in one or more grids and/or other patterns, which may include positioning some of the RFID readers to provide one or more desired overlapping read patterns, over one or more areas of the shopping facility, the entire sales floor of the shopping or the entire shopping facility. Some implementations additionally or alternatively position RFID readers at other locations, such as mounted on shelving systems, floor mounted, as part of point-of-sale systems, adjacent point-of-sale systems, adjacent entrances and exits, and/or other locations. Further, some embodiments may additionally utilize portable RFID readers, such as RFID readers that are configured to temporarily be placed in a location for a period of time, RFID readers carried (e.g., by a worker, on a shopping cart, etc.), and other such portable RFID readers.

The RFID readers detect RFID tags and/or information communicated from RFID tags (e.g., read rates, received signal strength indication (RSSI), which one or more antennas are detecting, angle of reception, communicated information such as tag identifier information, and/or other such RFID tag information). RFID tags can be affixed with and/or incorporated into packaging of items being sold from the shopping facility. The tag information typically includes at least a unique tag identifier that can be used to identify the item and distinguish it from every other item in the shopping facility. The tag identifier can further be associated with other item information, such as a type of product, count information, size information, category of product (e.g., consumer electronic, perishable, household goods, hardware, appliance, small appliance, etc.), and the like. Further, in some embodiments, the tag identifier can further be associated with a location within the shopping facility where the corresponding item is supposed to be positioned. One or more databases may be implemented to maintain tag identifier information and associated tag information and item information.

The facility evaluation system 102, in executing code of one or more computer program modules, is configured to receive in real-time the RFID tag read information from the array of RFID readers 108 to identify and/or track movement of items through the shopping facility. The location of items as they are moved through the shopping facility can be determined based on the location of the RFID readers 108, the reliable read area associated with each RFID tag, the overlap of read areas of neighboring RFID readers, and other such information. The facility evaluation system accesses retail facility mapping and/or coordinate information of the RFID readers, their corresponding read areas, and other such information. Additional sensor information may additionally be used, such as but not limited to bar code readers, movement sensors, and the like. Some embodiments further utilize image and/or video processing formation to further track movement of an item.

The facility evaluation system receives in real-time the RFID tag read information corresponding to different RFID tags from one or more of the RFID readers. As commercial or consumer items are moved the corresponding RFID tags will be detected by multiple different RFID reads, and as such, over time (e.g., a time for a person to walk between a first read area of a first RFID reader and a second read area of a second RFID reader) the facility evaluation system will receive, for a single RFID tag, the RFID tag read information from two or more RFID readers. This allows the facility evaluation system to rapidly identify at least a portion of a movement or route of that RFID tag. Again, an item RFID tag is exclusively associated with a specific consumer item of numerous different RFID tags each exclusively associated with different consumer items within the shopping facility that are offered for sale through the shopping facility. Further, the shopping facility is configured to sell multiple different types of products. Accordingly, each consumer item is typically one item of multiple of the same type of product (e.g., one box of multiple boxes of 28 oz Cheerios cereal; one pack of multiple 12-packs of cans of Coca-Cola; one box of multiple boxes each containing a Sony PlayStation gaming system; etc.).

The facility evaluation system, in executing code of one or more computer program modules, accesses one or more set of rules that are applied to identify movement patterns of consumer items, and applies at least a first set of rules to identify a pattern of movement of the first RFID tag and/or the corresponding consumer item as the first RFID tag and/or corresponding item is moved through at least a portion of the shopping facility. The one or more sets of rules can include but are not limited to receiving tag read information from multiple different RFID readers 108, receiving tag read information from a predefined set of two or more RFID readers, identifying that the identified first RFID tag has moved at least a threshold distance (which may be dependent on one or more factors, such as but not limited to type of product, origin location, time of day, shopping facility worker activities, and the like), identifying that the first RFID tag has been moved outside of a predefined area of the shopping facility, identifying that the first RFID tag is no longer being detected, identifying that the first RFID tag is no longer being detected after being moved from an origin location, identifying that the first RFID tag has entered one of one or more predefined areas, identifying that the first RFID tag is within a threshold distance of an area or other type of consumer item in the shopping facility, other such rules, or a combination of two or more of such rules. Further, one or more of the rules may additionally apply to video processing in identifying movement of the consumer item, particularly in tracking movement of the consumer item if and after the RFID tag is separated from the commercial item.

In some embodiments, for example, the evaluation system 102 identifies an origin location of the RFID tag (e.g., location within the shopping facility where the corresponding consumer item was positioned prior to the movement of the RFID tag). In identifying the historic movement and/or a pattern of movement of the RFID tag, the evaluation system can further identify that the historic movement pattern has a pattern origin corresponding to and/or within a threshold distance of the origin location of the first RFID tag. This origin location can have an effect on suspicious activities. The facility evaluation system in identifying the first historic movement, in some applications, additionally or alternatively identifies the first historic movement pattern having a pattern origin corresponding to the origin location of the first RFID tag and/or being within a threshold distance of the origin location (e.g., within a predefined area, within the same department of the shopping facility, within a sub-department, within a threshold radius, and/or other such distances). The use of the origin location can filter some of the historic movement patterns. Similarly, some origins are subject to greater origins of occurrences of suspicious activities.

One or more sets of one or more rules can be applied by the facility evaluation system to identify when to further consider and/or track movement of an RFID tag, and/or in collecting data to define and/or determine the pattern of movement of the RFID tag and the corresponding consumer item through at least one or more portions of the shopping facility. In some embodiments, the facility evaluation system identifies based on one or more rules that a first RFID tag (and thus the first corresponding item) has been moved beyond a first threshold distance, crossed one or more boundaries, moved to within a threshold of an area, been moved outside of a threshold area or the like associated with an origin location where the first RFID tag was positioned before movement of that RFID tag was detected. In other instances, for example, the facility evaluation system may identify when an RFID tag has moved beyond a boundary or moved a threshold distance without one or more other activities also occurring (e.g., the RFID tag stopping for at least a threshold time at a location of a point-of-sale system, being scanned by a particular bar code scanner, receiving a notification from a worker, etc.).

Further, some embodiments may cause one or more RFID tags to transition to a different state to allow the system to more easily track the particular RFID tag and/or obtain more precise information of movement of the RFID tag as it is moved through one or more areas of the shopping facility. In some embodiments, for example, the facility evaluation system 102 can cause one or more RFID readers to trigger an RFID tag to transition to a first state that causes the RFID tag to emit RFID tag information more frequently than in a typical state so that the one or more RFID readers continue to receive the RFID tag read information of the RFID tag at more frequent intervals. The RFID tag information transmitted by the RFID tag may be the same tag information that is typically communicated, while in other instances may be a sub-set of the information and/or may be different information. For example, in some embodiments, the RFID tag can be directed to transition to a dual mode such that the RFID tag responds in any session and/or state, a tag can be directed to adjust to a shorter duration between read states (e.g., read state A, and shorter non-read state B consistent with the Electronic Product Code (EPC) Generation 2 protocol), or the like. Additionally or alternatively, the RFID reader 108 may be transitioned to a different state in attempts to trigger the particular RFID tag more frequently. Based on the increased frequency of reads, the mapping of the movement of the RFID tag provides more frequent and dense concentrations of read information providing a more accurate mapping of the movement of the RFID tag through at least a portion of the shopping facility. Similarly, the increased frequency of reads further allows the system to get a more detailed granular movement pattern of the RFID tag, and allows for more precise identification of trigger events (e.g., leaving an area, entering an area, lack of movement, moving beyond a threshold without a predefined stop (e.g., at an area point-of-sale system), etc.).

In some embodiments, the facility evaluation system can activate more frequent reads from some RFID tags associated with high risk consumer items in response to a change in a detection, a transition from a predefined area, a predefined correlation of one or more portions of a suspicious pattern, or the like. For example, many RFID tags are not detected by overhead RFID readers while placed on product supports (e.g., shelf systems, modulars, racks, etc.). As such, the RFID tags are typically detected while being stocked on the product support system, but not accurately detected again until they are moved (e.g., pulled from the product support system by a customer or worker). As such, the facility evaluation system 102 may direct one or more RFID readers 108 to activate one or more RFID tags to respond more frequently based on the one or more RFID tags being detected after a threshold period of time has elapsed where that RFID tag had not been detected. This can increase the read frequency even before there is a determination that the RFID tag is associated with suspicious activity, as moved outside of a predefined area, and the like. For example, an RFID tag associated with a set of disposable razors may be detected while being stocked on a hanging rack on the sales floor, and not detected again because of interference by the hanging rack and/or other consumer items until a person subsequently removes the set of disposable razors from the hanging rack. One or more RFID readers 108, the facility evaluation system 102, the inventory system 124 or other system may detect the reading of the RFID tag associated with the disposable razor and further identify that this RFID tag has not been read for more than a threshold period of time (e.g., 15 minutes, one hour, three hours, which may depend on a correlation with the set of razors being stocked, or some other factor). In response to the detection after the threshold period of time one or more RFID readers 108 can be directed to cause the RFID tag to transition to the more frequent response state. In some instances, such activation of the more frequent response state may be based on the RFID tag being associated with a type of product that has a threshold theft rate.

The RFID tag may be maintained in this more frequent response state until otherwise triggered to revert to a default read state or other state. For example, the RFID tag can be left in the more frequent read state until it is confirmed that there is not suspicious activity associated with that RFID tag (e.g., non-suspicious activity confirmed), a sale is detected corresponding to that RFID tag, that the RFID tag is returned to the location from which it was removed, the RFID tag is associated with a worker, and/or other such conditions. The state may be maintained by the RFID tag until otherwise directed by a subsequent signal from an RFID reader to transition to another state, may be maintained for a threshold period of time since a last instruction to transition to the more frequent response state, or the like.

Additionally or alternatively, in some embodiments, the facility evaluation system 102 may direct one or more RFID readers 108 to emit amplified signals. The read signals from one or more RFID readers can be amplified in attempts to more accurately detect one or more RFID tags of interest. In some implementations, the facility evaluation system may detect potential suspicious activity based on one or more triggers and in response direct the amplification of one or more read signals and/or the reduction in the rate and/or signal strength of read signals from one or more other RFID readers in attempts to more accurately detect one or more RFID tags and limit interference. The RFID readers may be identified based on mapping coordinates of RFID readers relative to a shopping facility mapping.

The facility evaluation system may trigger continued tracking of the movement of the RFID tag as it continues to be moved through one or more areas of the shopping facility.

In some instances, the facility evaluation system is configured to determine and/or extract location coordinates of the movement of the first RFID tag. The facility evaluation system may, in part, identify the movement pattern 204 or mapping of movement of the RFID tag by use of the location of the RFID readers detecting and communicating the tag read information, timing between when neighboring RFID readers first detect and/or no longer detect the RFID tag of interest, durations of how long an RFID reader continues to detect the RFID tag, the location of known RFID reader detection overlap areas, video processing data, other sensor information, other such information, and often a combination of two or more of such information to determine the pattern of movement of the RFID tag and the corresponding consumer item. Using the tracked movement the facility evaluation system can determine a movement route or pattern of the first RFID tag as it is moved through one or more areas of the shopping facility.

Again, FIG. 2 illustrates a simplified exemplary movement pattern 204 of an RFID tracked over time, in accordance with some embodiments. The facility evaluation system 102 evaluates the determined movement pattern at least relative to one or more historic movement patterns. In some instances, the determined movement pattern it evaluated relative to historic movement patterns that correspond to the first consumer item associated with first RFID tag, the corresponding type of product, and/or apply other filtering to limit the number of historic movement patterns considered in evaluating the movement. Often, movement patterns corresponding to suspicious activities follow known movement patterns based on an origin of the consumer item, the type of product, types and/or numbers of predefined triggers and/or alerts, and/or other such factors. For example, an exemplary expected movement pattern of a person stealing an electronic gaming system may include a first movement trigger or flag corresponding to an initial detection of the RFID tag of the gaming system being moved from a shelf or other storage location of the corresponding gaming system. Additionally or alternatively, a movement flag or trigger may correspond, for example, to the RFID tag being moved outside of an electronics area 206 of the shopping facility or outside of the electronics area 206 without a corresponding sales transaction occurring. In some instances, the movement of the RFID tag outside of the electronics area 206 and without a sales transaction may trigger an alert to the facility evaluation system and/or one or more workers. The alert may direct the facility evaluation system to monitor and/or evaluate the corresponding movement. In other instances, additional alerts or a threshold number of alerts corresponding to a known movement pattern may result in the facility evaluation system identifying the movement of an RFID tag being consistent with suspicious activity.

Still referring to the example of movement of a gaming system, the movement pattern may include one or more other movement flags and/or alerts, such as movement along a route through the shopping facility that is consistent with one or more historic movement patterns, movement of the RFID tag a threshold distance within a threshold period of time, and other such flags (e.g., corresponding to a person transporting the RFID tag a threshold distance within a threshold duration (e.g., relatively short period of time)). Again, this may trigger one or more alerts. As a further example, the RFID tag may be moved from the electronics area 206, through a toy department area 208, and into a towel and bedding linens area 210 of the shopping facility. A further movement flag may correspond to the detected lack of movement of the RFID tag for a threshold period of time and/or a loss of detection of the RFID tag (e.g., because it is shielded) for a threshold period of time. For example, the RFID tag corresponding to the gaming system may be moved into the towel area of the store where towels are sold, and the RFID tag stop moving for a threshold period of time corresponding to a customer cutting the RFID tag off of the gaming system and hiding the cut-off RFID tag within a stack of towels. This detected lack of movement (or loss of detection) may trigger another alert and/or the lack of movement in cooperation with the movement pattern and/or one or more other triggers may be detected and/or determined as suspicious activity. Some embodiments may further identify when an RFID tag is moved from one area of the shopping facility to another area of the shopping facility (e.g., from a high theft area to a lower theft area), which may correspond with one or more historic movement patterns. As an RFID tag is moved, the facility evaluation system may update a suspicious activity rating or score (e.g., between +1 and −1) based on a relationship of the movement to one or more historic movement patterns. Some embodiments categorize or rate areas or zones of a shopping facility relative to occurrences of theft (e.g., high, medium, low zones), and a grid of RFID readers configured to operate relative to those zones. Different rules may be applied by the evaluation system 102 based on the zone from which the consumer item is taken.

In some embodiments, the facility evaluation system can access, within the database of historic movement patterns 114, a set of at least one historic movement patterns. As introduced above, in some embodiments, the facility evaluation system may limit the historic movement patterns that are considered by applying one or more filters. For example, the facility evaluation system may access a set of one or more historic movement patterns that are specific to the first product and/or type of product of the first consumer item, patterns corresponding to an origin location within the shopping facility from which the item was initially moved, or the like. Further, at least one and typically each of the historic movement patterns of the accessed set of historic movement patterns define a pattern of movement corresponding to known suspicious activity. These historic movement patterns may be acquired over time, learned based on viewing RFID tag movements corresponding with actual known suspicious activity, learned based on video data of theft events, obtained from other retail facilities, based on patterns learned from other sources, and/or other such information. Further, the database of historic movement patterns can be updated over time by the facility evaluation system 102 and/or the central evaluation system 120 based on determined suspicious activity, confirmed suspicious activity (e.g., based on confronting the person, arrest of the person, etc.), confirmed non-suspicious activity, activity that was not identified as suspicious activity, and typically a combination of two or more of such activities. For example, the facility evaluation system and/or central evaluation system can update the database and/or modify rules based on the detection of non-suspicious activity as well as detected suspicious activity.

One or more additional sets of rules can be accessed that are applied to evaluate movement patterns. These sets can evaluate the detected movement patterns relative to one or more threshold variations of one or more historic movement patterns. The thresholds can be determined based on historic variations, averages, standard deviations, information from one or more other shopping facilities, variations from other historic movement patterns and the like. Further, the rules may allow some historic movement patterns to be used in evaluating a detected movement pattern, while excluding some historic movement patterns. For example, some rules may limit historic movement patterns to be considered based on differences in origins of the respective movement patterns, differences in other items and/or types of items also transported by the person moving the RFID tag being considered or of interest, and/or other such rules. The facility evaluation system can apply the additional set of rules and identify when the detected pattern of movement corresponds within threshold variations with at least one historic movement pattern of the set of at least one historic movement patterns.

In some embodiments, the facility evaluation system, in implementing code, can further be configured to cause a notification to be communicated to the central evaluation system 120 when the detected pattern of movement of the RFID tag and corresponding consumer item is consistent with the one or more historic movement pattern.

Based on the determined movement of an RFID tag detected by one or more RFID readers and/or in determining one or more patterns of movement, the facility evaluation system 102 and/or video processing system 122 may further take into consideration a portion of the pattern of movement determined based on video processing. For example, video processing can be used to identify an object (e.g., the person intending to steal the consumer item) transporting the consumer item. The video processing system 122 can implement code that enables the video processing system to identify specific video content corresponding to cameras capturing image and/or video content of areas of the shopping facility consistent with the movement of the RFID tag and the timing of the captured RFID tag information. Further, the video processing system 122 can apply one or more rules to identify one or more sets of pixels over multiple sets of one or more frames that correspond to the location of the RFID tag being tracked by the facility evaluation system (e.g., determined coordinate information based on the RFID tag information and location of RFID readers can be mapped to video content and used to specify areas within the video content where the RFID tag is located; and threshold numbers of corresponding pixels in a threshold number of frames that are within one or more threshold distances of the RFID tag can be identified as an "object" transporting the RFID tag and commercial item).

Further, some embodiments further identify, based on detected RFID tag read information when an unusual number of the same or similar consumer items are moved. Typically, when a customer intends to purchase a consumer item that person selects a common number of that consumer item. It is been discovered that in some instances, when a person intends to steal a particular type of product that person often takes an unusual number of that product. As such, in some embodiments, the facility evaluation system 102 may apply one or more rules to identify, specific to the type of the one or more products, to detect when a quantity of one or more or the collection of one or more consumer items exceeds a threshold. This detection may define suspicious activity and initiate further tracking, may cause the facility evaluation system to direct one or more RFID readers to trigger one or more of the RFID tags to communicate RFID tag information more frequently, may direct the video processing system to initiate capturing and/or processing video content, may direct the notification to the central evaluation system 120, may direct the communication of video content to the central evaluation system, and/or other such actions associated with potential suspicious activity and/or activity that meets one or more thresholds to be specified as suspicious activity.

Through the use of RFID tag the pattern tracking system 100 can provide real-time and rapid identification of suspicious activity to allow the shopping facility and/or one or more workers at the shopping facility to take one or more actions. Previous methods of detecting such activity was typically dependent on an individual store worker or team of individuals moving through a shopping facility and being in the right place at the right time to detect potential suspicious activity. Such activities typically missed most of the suspicious activity and/or could not obtain sufficient information in real-time to take action to reduce or prevent such theft and other such suspicious activity. Some systems may have attempted to use video processing alone or in combination with workers moving about the store to identify suspicious activity. Video processing, however, often is incapable of accurately identifying when a consumer item is retrieved or being moved, what consumer item is retrieved, and cannot accurately track in real-time a person engaged in suspicious activity. Still further, previous attempts to detect potential suspicious activity could not track the movements of multiple different items, nor identify in real-time movement patterns and determine whether those movement patterns corresponded within threshold variations of historic movement patterns.

Through the use of the RFID tags, however, some present embodiments provide highly accurate, rapid and in some instances immediate identification of movement of the RFID tag (e.g., as soon as a threshold change in RFID tag read information is detected by an RFID reader, and/or as soon as the RFID tag is detected by an RFID reader that was previously not detecting that RFID tag), allowing a detailed and precise mapping of the movement of that RFID tag and corresponding consumer item. Applicants believe that previous systems could not provide the simultaneous and accurate tracking and identification of movement patterns of numerous different consumer items within a retail shopping facility at near real-time as provided by the pattern tracking system 100. Further, the present embodiments enable the simultaneous processing to detect of movement of tens to hundreds of RFID tags, and simultaneously determine patterns of movement of those RFID tags.

As described above, some embodiments utilize the camera systems 106 and video processing system 122 in determining the movement pattern of the RFID tag and/or corresponding consumer item, and/or use the video processing system in continuing to determine and track the movement of at least the object transporting the consumer item. In some instances, the facility evaluation system can further access video content and/or provide relevant location and/or coordinate information within the shopping facility of the movement of the RFID tag of interest and the corresponding commercial item, which can be used to acquire relevant portions of video content that includes images and/or video of the person moving the RFID tag and/or consumer item. Again, the video processing system can execute code of one or more computer program modules to use location and timing information provided by the facility evaluation system based on the tracked movement of the RFID tag and the timing of the detected movement to identify corresponding images and/or video content that capture at least the person transporting the RFID tag and consumer item along the movement pattern. The identified image and/or video content can be tags and/or communicated to the facility evaluation system and/or the central evaluation system.

In some embodiments, the video processing system 122 obtains a set of one or more rules to identify an object within video content. The system can identify a series of locations of the RFID tag of interest based on a series of tag read information received from the RFID tag during the pattern of movement, and typically further identifies corresponding timing of those reads. The video processing system can apply the set of one or more rules to identify video content corresponding to the series of locations and timing information and process the video content corresponding to the pattern of movement and the timing corresponding to the movement along the pattern of movement to at least in part identify an object within the video content that is moving the RFID tag of interest along the pattern of movement. For example, based on the RFID tag information the time when a consumer item was initially retrieved and the location of the consumer item when initially retrieved can be identified and video content corresponding to that time and location can be identified based on a mapping of fields of view of cameras and video recording times, and further video content can be acquired of at least the person moving the consumer item and in some instances the consumer item as the consumer item was and/or is moved through the shopping facility. The identified portions of the video content may be communicated to the facility evaluation system 102, the central evaluation system 120, caused to be played back and/or made accessible through one or more user computing systems 126 to one or more workers associated with the retail facility, communicated to other components, or a combination of two or more of such components. In some embodiments, the evaluation system 102 identifies the series of locations of the RFID tag and corresponding times based on a series of tag read information received from the RFID tag. Further, the evaluation system 102 and/or the video processing system can identify the set of video contents corresponding to the series of locations and corresponding times. The facility evaluation system 102 can direct the video processing system to process the identified set of video contents.

Further, in some applications, the video processing system is configured to process video content prior in time to a time period when the pattern of movement of the RFID tag occurred to identify video content that includes the "object" prior to the "object" having retrieved the consumer item of interest. Additionally or alternatively, the video processing system can further process video content after the RFID tag has stopped moving for a threshold period of time, for example, because the person moving the corresponding consumer item has removed the RFID tag. The video processing system and/or the facility evaluation system 102 can uses the identified video content containing the person/object moving the consumer item and generate a mapped route of the person/object as it traveled through the shopping facility, in some instances including the portion of the persons route prior to retrieving the consumer item and/or after the person has separated the corresponding RFID tag from the consumer item.

Typically, the video processing system and/or the facility evaluation system has mapping coordinate information of the shopping facility relative to the positioning of the camera systems 106 within the shopping facility, and in some instances coordinates within the camera angle of each camera systems to more precisely identify and track movements of one or more objects within the shopping facility that are used to generate the mapping of the person/object. For example, in some instances, the video processing allows the system to track the person/object to the time the person/object entered the shopping facility, and in some instances parked their car at the shopping facility. Similarly, video content can continue to be identified to track the person through his/her entire time within the shopping facility and/or on the shopping facility premises. In some applications, the video processing system 122 can be activated by the evaluation system 102 to initiate processing of relevant video content corresponding to the RFID tag of interest, while in other instances the video processing system may operate without activation by the evaluation system. The activation by the evaluation system may be the communication by the evaluation system of the location information and timing information corresponding to at least part of the detected movement pattern of the RFID tag of interest.

In some embodiments, the facility evaluation system 102 further communicates with the video processing system 122 to obtain movement information as identified by the video processing system of the consumer item associated with the RFID tag and/or the object/person moving the consumer item. Again, the movement tracked through video processing may include image recognition of predefined objects within the shopping facility, content from known cameras, text capture, and/or other such information. The evaluation system can further be programmed to receive that movement information of the consumer item and/or person from the video processing system, and evaluate that movement information relative to movement information and/or lack of movement information of the RFID tag. Based on the RFID tag read information and movement information from the video processing system, the evaluation system 102 can detect a separation between the RFID tag and the consumer item. In some instances, for example, the evaluation system can identify a loss of reading of the RFID tag for more than a threshold period of time, which the evaluation system may associate with the tag being placed in a location that is shielded from the RFID readers (e.g., RFID tag being removed by a person and placed in a shelf system, placed in a trashcan, placed under another commercial item(s) that interferes with the reading of the tag, etc.), or the like. When it is determined that the RFID tag is no longer moving but the commercial item continues to move, the evaluation system can identify that the RFID tag has been separated from the commercial item or otherwise intentionally interfered with. In many instances, this is confirmation of suspicious activity, grounds for questioning, and/or may be illegal activity in some jurisdictions.

Further, in some embodiments, the evaluation system may generate an alert based on the separation between the RFID tag and the commercial item. The alert may be to a one or more members of a local security team of the shopping facility, a facility manager, or the like to take action while the person is in the store or just after leaving the store; may alert local law enforcement; may alter the central evaluation system 120; other such alerts; or combination of two or more of such alerts. Similarly, the alert may be an audible alert and/or visual alert that corresponds to the persons location and may continue to change to locations corresponding to the person as the person moves through the shopping facility (e.g., audibly indicating a detection of an error condition and asking the person to seek assistance from a shopping facility worker).

Similarly, the facility evaluation system 102 may communicate with an RFID reader and direct the RFID reader to activate the particular RFID tag of interest in response to the RFID tag crossing one or more thresholds or boundaries. For example, the facility evaluation system may detect an RFID tag has moved passed a threshold boundary corresponding to an area of the shopping facility without having been purchased in that area. This may correspond to an initial suspect action and trigger one or more RFID readers to direct at least the tag of interest to transition to the RFID tag to a state in which the RFID tag communicates the RFID tag information more frequently. In some instances, the evaluation system 102 may further activate one or more cameras and/or initiate the collection of RFID tag movement information and/or video content that is communicated to the central evaluation system 120. This provides the central evaluation system and/or one or more evaluator workers associated with the central evaluation system information earlier than if waiting until suspicious activity is confirmed.

The video processing system can further be configured to accumulate video content of the person/object while at the shopping facility and prior to the time period when the pattern of movement of the RFID tag occurred. Additionally or alternatively, the relevant portions of the video content capturing the person/object is communicated to the facility evaluation system 102 and/or the central evaluation system 120 to be accumulated, compiled and/or otherwise collected to allow subsequent viewing of the video content. In some embodiments, the video processing system accumulates video starting at the time the initial detection of movement of the RFID tag, and the video content tracking the target object, such as to a second location where an alert event is triggered based on one or more factors and/or parameters being met (e.g., RFID tag leaving a threshold area without stopping at a point-of-sale system within the threshold area). Further video content can be acquired of the object along the route throughout one or more portions of the store corresponding to the movement of the RFID tag, which can be communicated to the facility evaluation system and/or the central evaluation system. In some instances, the video is communicated in substantially real-time based on the use of the RFID tag information in accurately tracking the location and/or the previous identification of the "object" within the video content corresponding to a person moving the consumer item.

Further, as described above the central evaluation system is communicatively coupled with the evaluation system of each of multiple different shopping facilities that are located at different locations. For example, the central evaluation system may be associated with a chain of multiple different but associated retail shopping facilities. In some approaches, the central evaluation system can provide at least some of the processing of the RFID tag movement information relative to identifying a movement pattern and/or determining whether the movement pattern corresponds to one or more historic movement patterns. The central evaluation system 120 executes code of one or more computer program modules to determine whether and when to direct a notification that an RFID tag movement pattern is consistent with one or more historic movement patterns, the mapped route, the accumulated video content, other such information or a combination of two or more of such information to a user computing system 126 of an evaluator worker directly associated with the central evaluation system to confirm the suspicious activity. For example, the evaluator worker can view the mapped pattern of movement of the RFID tag and/or the person moving the consumer item relative to one or more historic movement patterns, can view video content of the person moving the consumer item, and using such information can confirm suspicious activity, request additional data, reject the suspicious activity, and/or other such view.

Further, the facility evaluation system, the evaluator worker and/or the central evaluation system may confirm suspicious activity based on one or more detected actions, such as the worker seeing and/or central evaluation system detecting through the video content the object removing the RFID tag and/or other marker or tag (e.g., a spider wrap with an alarm) is removed from the consumer item. Similarly, the central evaluation system 120 and/or the evaluator worker can notify one or more workers at the shopping facility to take one or more actions, such as follow the person moving the consumer item, notify local police, confront the person moving the consumer item, trigger one or more alarms, direct one or more workers to look for accomplices, other such actions, or combination of two or more actions. In some implementations, the central evaluation system 120 may perform facial and/or body recognition in attempts to correlate a person associated with suspicious activity was previously identified and associated with previous incidents of suspicious activity at the same and/or one or more different shopping facilities.

In some embodiments, the evaluation system 102 and/or the video processing system 122 obtains one or more set of rules to continue to track movement of identified objects. This set of rules can be applied to evaluate further video content and continue to track additional movement of the consumer item following the identification that the pattern of movement of the consumer item is consistent with one or more historic movement pattern, and continue to identify additional video content that includes the movement of the consumer item as the consumer item is moved over time. This additional video content can be accumulated and/or immediately communicated to the facility evaluation system 102 and/or the central evaluation system 120 over the time. The continued monitoring allows the tracking of the person to identify one or more actions performed by the person and/or anticipate actions of the person based on historic patterns. Still further, such accumulation of video content can be used in subsequent prosecution of the one or more people involved in the theft or damaging of one or more consumer items.

The facility evaluation system 102 is further configured to receive an alert from the central evaluation system 120 confirming suspicious activity. Again, this may be based on the evaluator worker, the central processing system confirming one or more threshold correlations between the movement pattern of the RFID tag and/or person, and one or more historic movement patterns, evaluation of other activity, and the like. The facility evaluation system and/or the central evaluation system can notify at least one worker at the shopping facility while the consumer item and the object are still in the shopping facility. Again, the use of the RFID tags allows for accurate and rapid, real-time identification of movement of the RFID tag and corresponding consumer item. As such, the pattern tracking system 100 can detect the suspicious activity in near real-time allowing for a rapid response by the shopping facility and/or the workers at the shopping facility.

In some embodiments, the video processing system 122 obtains a set of rules to identify an object within video content, and applies the set of rules to process video content corresponding to the detected pattern of movement and to further identify an object within the video content moving the RFID tag along the pattern of movement. This set of rules may be similar to the rules described above with reference to the video processing. One or more additional sets of rules to identify potential accomplices can further be accessed and applied to identify when an accomplice object within the video content is associated with the identified object moving the RFID tag. For example, the processing of the video content previous in time to the initiation of movement of the RFID tag can allow the video processing system to track a first person that moved the consumer item back in time and determine whether one or more other people entered the store with the first person or within a threshold time of the first person. Similarly, the video processing system may process additional video content that is similar in time (e.g., during and/or a threshold time before) to the movement of the RFID tag in attempts to identify activity of one or more of the other people that may correspond to historic accomplice patterns, which may be maintained in one or more of the historic movement patterns databases 114 and/or other databases.

Further, some embodiments may evaluate RFID tag movements of multiple other RFID tags during and/or previous to the time of the pattern of movement of the RFID tag associated with the suspicious activity in attempts to identify patterns of movement of the one or more other RFID tags that correspond within threshold variations with one or more historic accomplice movement patterns. Accordingly, the facility evaluation system and/or the video processing system may identify when movement of the one or more accomplice objects/person corresponds within threshold variations with one or more accomplice historic movement patterns of a set of at least one historic movement patterns. The evaluation system can cause an accomplice notification to be communicated to the central evaluation system 120 and/or one or more local user computing system 126, such as to a workers smartphone, wireless headset, hand-held scanning system, other such devices, or combination of two or more of such devices. In some applications, when the facility evaluation system 102 detects a threshold correlation with one or more historic movement patterns (e.g., an RFID tag has the appearance of the potential of being stolen) the facility evaluation system and/or the video processing system can cross reference the video content for both the object of the person moving the consumer item, as well as checking video content where accomplices historically have been identified. For example, if someone is standing out front for a threshold period of time then that would increase the confidence of the detection of the suspicious activity event and/or trigger communication with the central evaluation system. Similarly, the facility evaluation system may detect activity of a potential accomplice (e.g., loitering at a particular area, a predefined pattern of movement, etc.) trigger the facility evaluation system to review previous RFID tag movement and/or more precisely evaluate and track current movements of RFID tags.

Some embodiments further utilized detected patterns in subsequent evaluations by storing information (e.g., location information, pattern information, coordinates, etc.) of the tracked movement of the RFID tag. This can be movement patterns identified as corresponding with suspicious activity, and as such stored in the historic movement patterns database 114, or as a non-suspicious pattern in a non-suspicious pattern database. Further, one or more rules may be updated and/or modified based on associating a tracked movement with one or more historic movement patterns.

Figure 3:
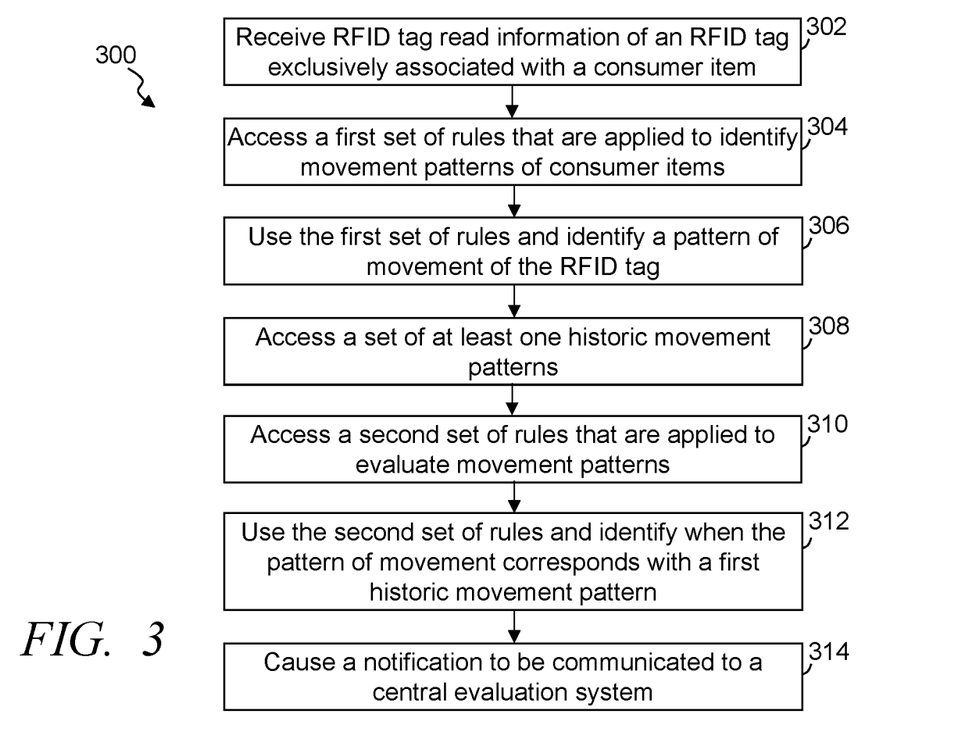
FIG. 3 illustrates a simplified flow diagram of an exemplary process of associating movement patterns of radio frequency identification (RFID) tags with one or more historic movement patterns, in accordance with some embodiments.

FIG. 3 illustrates a simplified flow diagram of an exemplary process 300 of associating movement patterns of RFID tags with one or more historic movement patterns, in accordance with some embodiments. In some instances, this association allows for the detection of suspicious movement patterns within a retail shopping facility. Other activity may additionally or alternatively be tracked and identified based on corresponding historic movement patterns (e.g., loitering, damaging consumer items, partially or fully consuming consumer items while in the shopping facility, workers performing and/or not performing assigned tasks, movement of consumer items consistent with determined needs within the shopping facility, and/or other such activities). In step 302, RFID tag read information from two or more of the RFID readers of an RFID tag is received at an evaluation system 102 of a retail shopping facility 200. The RFID tag is typically exclusively associated with a single particular consumer item. Again, the retail facility maintains numerous different consumer items for sale to customers at the retail shopping facility, each of the consumer items being exclusively associated with a different RFID tag. Further, the consumer item is typically one of a plurality of consumer items of a particular type of product. Each RFID tag is configured to separately be read by the multiple RFID readers 108 distributed throughout the shopping facility.

In step 304, a set of rules are accessed that are applied to identify movement patterns of consumer items. In step 306, one or more rules of the set of rules are used to identify a pattern of movement of the particular RFID tag as the RFID tag is moved through at least a portion of the shopping facility. In step 308, a set of at least one historic movement patterns is accessed within the database of historic movement patterns 114. In some instances, the set of historic movement patterns is specific to the particular consumer item and each defines a pattern of movement corresponding to known suspicious activity.

In step 310, a second set of rules are accessed that are applied to evaluate movement patterns. In step 312, one or more of the second set of rules are used to identify when the pattern of movement of the particular RFID tag corresponds within threshold variations with a historic movement pattern of the set of at least one historic movement patterns. In step 314, a notification is caused to be communicated to a central evaluation system 120 when the pattern of movement of the particular RFID tags and/or corresponding consumer item is consistent with the historic movement pattern.

Some embodiments identify an origin location of the RFID tag. Using the origin location information, some applications identify the historic movement pattern having a pattern origin corresponding to and/or within a threshold distance of the origin location of the RFID tag. The threshold distance may be based on a type of product of the consumer item, activity levels proximate the origin, numbers of similar or related products, and/or other such information.

In some implementations, one or more video processing systems 122 obtain a set of one or more rules to identify an object within video content. The set of rules can be used to process video content corresponding to the pattern of movement to identify an object within one or more frames that corresponds to the movement of the RFID tag, and thus corresponds to a person moving the RFID tag along the pattern of movement. The video content prior in time to a time period when the pattern of movement occurred is processed, and a mapped route of the object is mapped as it traveled through the shopping facility. The video processing system can further be configured to accumulate video content of the object while at the shopping facility and prior to the time period when the pattern of movement corresponding to the RFID tag occurred. As such, movement of the person corresponding to the object within the video content can be tracked back in time prior to detecting the movement of the RFID tag. Some embodiments direct the notification, the mapped route, and/or the accumulated video content to an evaluator worker to be used by the evaluator worker in confirming the suspicious activity. For example, a notification can be communicated to the evaluator worker instructing the worker to access corresponding mapped route information and video content to be considered and evaluated by the evaluator worker. Additionally or alternatively, some or all of the notification, the mapped route information and the video content can be communicated to a user computing system 126 used by the evaluator worker.

Some embodiments access and apply a set of rules to evaluate further video content and track additional movement of the consumer item following the identification that the pattern of movement of the consumer item is consistent with one or more historic movement patterns. Additional video content can be identified that includes the movement of the consumer item and/or object moving the consumer item as the consumer item is moved over time. The additional video content may be accumulated and/or communicated to the central evaluation system. In some instances, the additional video content is communicated in real-time as the additional video content is identified providing the central evaluation system 120 and/or the evaluator worker with substantially real-time views of the activity within the shopping facility relative to the consumer item.

In some applications, an alert is received from the central evaluation system 120 confirming suspicious activity. At least one worker at the shopping facility may be notified while the consumer item and the person moving the consumer item are still in the shopping facility. The video processing system may further be configured to obtain a third set of rules to identify an object within video content. The third set of rules can be used to process video content corresponding to the pattern of movement to identify an object moving the RFID tag along the pattern of movement. One or more additional set of rules can be obtained and used to identify when an accomplice object is associated with the identified object, and identify when movement of the accomplice object within the video content corresponds within threshold variations with a first accomplice historic movement pattern of the set of at least one historic movement patterns. An accomplice notification can be communicated to the central evaluation system, a user computing system 126, and/or other notification to a worker at the shopping facility.

Applicants have identified that valuable consumer items with RFID tags are being shoplifted without retail shopping facility systems and/or retail workers having advanced notice or being able to consistently detect such suspicious activities. The pattern tracking system 100, in some embodiments, utilize a grid of RFID readers 108 that are distributed throughout one or more areas of a shopping facility 200 to detect movement of RFID tags each exclusively associated with a particular consumer item, and track and identify movement patterns of the RFID tags. In some embodiments, one or multiple facility evaluation systems 102 are implemented relative to a single shopping facility to simultaneously evaluate tens or hundreds of RFID tags. Further, in some implementations, the facility evaluation system may disregard one or more RFID tags being detected as they move through the shopping facility in response to determining that the movement patterns of those RFID tags do not have a threshold consistency with one or more historic pattern movement corresponding to suspicious or other activity adverse to the shopping facility and/or the safety of other shoppers and/or workers at the shopping facility, and/or upon identifying that the movement patterns are within threshold variations of historic movement patterns that have been identified as not being suspicious.

Some embodiments further include one or more camera systems 106, which may have limited fields of view, wide fields of view, have a 360 degree field of view, etc. One or more video processing systems 122 can access and evaluate or otherwise integrate the video content relative to locations identified based on the RFID tag movements to further monitor patterns of erratic or suspicious consumer items movements. Based on the detected patterns through the RFID detected patterns and/or video processing, the facility evaluation system can often detect erratic and/or suspicious activity in real-time and while the consumer item is still within the shopping facility to provide advanced notice to one or more relevant parties (e.g., shopping facility workers, police, security service, etc.) in an attempt to thwart and/or abduct the assailant before and/or as they exit the shopping facility with the one or more consumer items.

In some embodiments, one or more sets of rules are established and applied based on erratic and/or suspicious patterns of activity that have either been caught shoplifting or were determined to be those of a shoplifter that was not apprehended. Some implementations further utilize rules corresponding to expected patterns of a normal shopping activity and evaluate RFID tag movements relative to both suspicious and normal shopping patterns. The system uses real time tag tracking data from the grid of RFID readers 108. Further, in some instances the system utilizes inputs from real time camera systems. The facility evaluation system provides, in part, a predictive engine pattern recognition applying one or more rules and/or thresholds to identify events and/or activities, and potential identify a suspected shopper. One or more alerts may be triggered to cause actions in attempts to thwart and/or abduct the suspected shopper before, as and/or after the shopper has exited the shopping with the consumer item.

Figure 4:
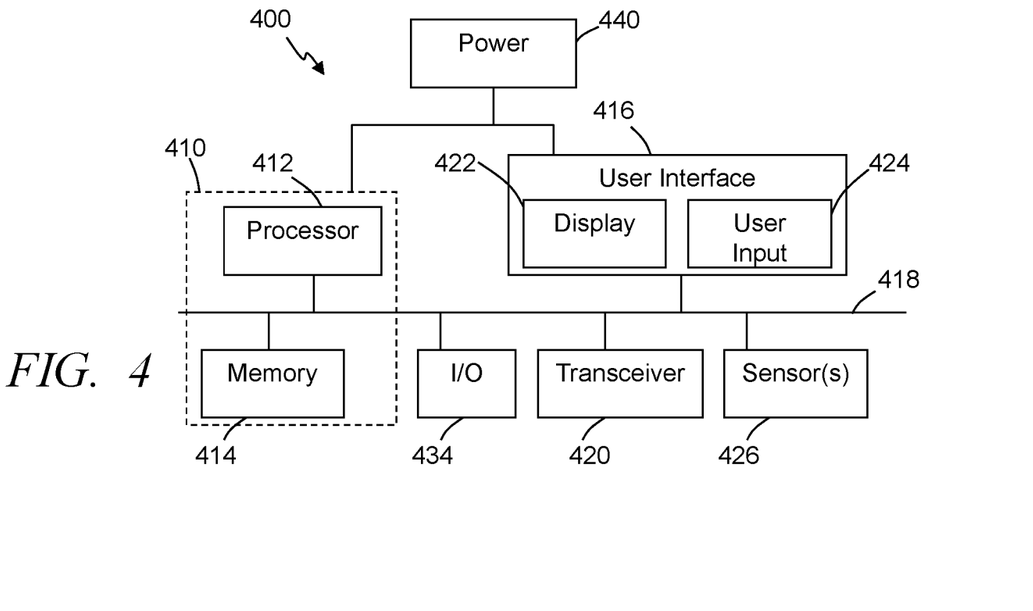
FIG. 4 illustrates an exemplary system for use in implementing methods, techniques, devices, systems, apparatuses, servers, sources and detecting patterns of movement of RFID tags that correspond to one or more historic movement patterns.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the systems, components, circuits, circuitry, functionality, apparatuses, processes, or devices of the pattern tracking system 100 and/or other above or below mentioned systems or devices, or parts of such circuits, circuitry, functionality, systems, apparatuses, processes, or devices. For example, the system 400 may be used to implement some or all of the facility evaluation system 102, the central evaluation system 120, video processing systems 122, RFID readers 108, camera systems 106, inventory system 124, user computing systems 126, and/or other such components, circuitry, functionality and/or devices. However, the use of the system 400 or any portion thereof is certainly not required.

By way of example, the system 400 may comprise a control circuit or processor module 412, memory 414, and one or more communication links, paths, buses or the like 418. Some embodiments may include one or more user interfaces 416, and/or one or more internal and/or external power sources or supplies 440. The control circuit 412 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over the one or more communications and/or computer networks 112 (e.g., LAN, WAN, Internet) providing distributed and/or redundant processing and functionality. Again, the system 400 may be used to implement one or more of the above or below, or parts of, components, circuits, systems, processes and the like. For example, the system may implement the facility evaluation system 102 with the control circuit being an evaluation control circuit, the central evaluation system 120 with the control circuit being a central evaluation control circuit, video processing systems 122 with the control circuit being a video processing control circuit, RFID readers 108 with the control circuit being a RFID reader control circuit, camera systems 106 with the control circuit being a camera system control circuit, inventory system 124 with the control circuit being an inventory control circuit, user computing systems 126 with the control circuit being a computing system control circuit, or other components.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network 112 (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the facility evaluation system 102, RFID readers 108, camera systems 106, video processing system 122, central evaluation system, etc. The sensors can include substantially any relevant sensor, such as optical based scanning sensors to sense and read optical patterns (e.g., bar codes), distance measurement sensors (e.g., optical units, sound/ultrasound units, etc.), movement sensors, weight sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 112. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

Some embodiments provide retail systems that detect suspicious movement patterns within a retail shopping facility. These systems comprise at each of multiple different shopping facilities: an array of multiple camera systems, an array of multiple radio frequency identification (RFID) readers, and a shopping facility evaluation system communicatively coupled with a database of historic movement patterns, wherein the evaluation system comprises an evaluation control circuit that in implementing code stored on memory is configured to: receive RFID tag read information from two or more of the RFID readers of a first RFID tag exclusively associated with a first consumer item of numerous different RFID tags each exclusively associated with different consumer items within the shopping facility, wherein the first consumer item is one of a plurality of consumer items of a first product; access a first set of rules that are applied to identify movement patterns of consumer items; apply the first set of rules to identify a first pattern of movement of the first RFID tag as the first RFID tag is moved through at least a portion of the shopping facility; access, within the database of historic movement patterns, a set of at least one historic movement patterns specific to the first product and each defining a pattern of movement corresponding to known suspicious activity; cause a first RFID reader of the two or more readers to trigger the first RFID tag to transition to a first state causing the first RFID tag to emit the RFID tag information more frequently and continue to receive the RFID read information of the first RFID tag at more frequent intervals; access a second set of rules that are applied to evaluate movement patterns; apply the second set of rules and identify when the first pattern of movement corresponds within threshold variations with a first historic movement pattern of the set of at least one historic movement patterns; and cause a notification to be communicated to a central evaluation system when the first pattern of movement of the first consumer item is consistent with the first historic movement pattern.

Some embodiments provide methods of detecting suspicious movement patterns within a retail shopping facility, comprising: by a control circuit, operably coupled to at least one memory and implementing code stored on the memory, configured to: receive, at an evaluation system of a retail shopping facility of multiple shopping facilities, RFID tag read information from two or more RFID readers of a first RFID tag exclusively associated with a first consumer item of numerous different RFID tags each exclusively associated with different consumer items within the shopping facility, wherein the first consumer item is one of a plurality of consumer items of a first product; accessing a first set of rules that are applied to identify movement patterns of consumer items; using the first set of rules and identifying a first pattern of movement of the first RFID tag as the first RFID tag is moved through at least a portion of the shopping facility; accessing, within a database of historic movement patterns, a set of at least one historic movement patterns specific to the first consumer item and each defining a pattern of movement corresponding to known suspicious activity; causing a first RFID reader of the two or more readers to trigger the first RFID tag to transition to a first state causing the first RFID tag to emit the RFID tag information more frequently and continuing to receive the RFID tag read information of the first RFID tag at more frequent intervals; accessing a second set of rules that are applied to evaluate movement patterns; using the second set of rules and identifying when the first pattern of movement corresponds within threshold variations with a first historic movement pattern of the set of at least one historic movement patterns; and causing a notification to be communicated to a central evaluation system when the first pattern of movement of the first consumer item is consistent with the first historic movement pattern.

In some embodiments, retail systems detect suspicious movement patterns within a retail shopping facility. In some implementations, a system comprises: at each of multiple different shopping facilities: an array of multiple camera systems, an array of multiple radio frequency identification (RFID) readers, and a shopping facility evaluation system communicatively coupled with a database of historic movement patterns, wherein the evaluation system comprises an evaluation control circuit that in implementing code stored on memory is configured to: receive RFID tag read information from two or more of the RFID readers of a first RFID tag exclusively associated with a first consumer item of numerous different RFID tags each exclusively associated with different consumer items within the shopping facility, wherein the first consumer item is one of a plurality of consumer items of a first product; access a first set of rules that are applied to identify movement patterns of consumer items; apply the first set of rules to identify a first pattern of movement of the first RFID tag as the first RFID tag is moved through at least a portion of the shopping facility; access, within the database of historic movement patterns, a set of at least one historic movement patterns specific to the first product and each defining a pattern of movement corresponding to known suspicious activity; access a second set of rules that are applied to evaluate movement patterns; apply the second set of rules and identify when the first pattern of movement corresponds within threshold variations with a first historic movement pattern of the set of at least one historic movement patterns; and cause a notification to be communicated to a central evaluation system when the first pattern of movement of the first consumer item is consistent with the first historic movement pattern.

Further, some embodiments provide methods of detecting suspicious movement patterns within a retail shopping facility, comprising: by a control circuit, operably coupled to at least one memory and implementing code stored on the memory, configured to: receive, at an evaluation system of a retail shopping facility of multiple shopping facilities, RFID tag read information from two or more RFID readers of a first RFID tag exclusively associated with a first consumer item of numerous different RFID tags each exclusively associated with different consumer items within the shopping facility, wherein the first consumer item is one of a plurality of consumer items of a first product; accessing a first set of rules that are applied to identify movement patterns of consumer items; using the first set of rules and identifying a first pattern of movement of the first RFID tag as the first RFID tag is moved through at least a portion of the shopping facility; accessing, within a database of historic movement patterns, a set of at least one historic movement patterns specific to the first consumer item and each defining a pattern of movement corresponding to known suspicious activity; accessing a second set of rules that are applied to evaluate movement patterns; using the second set of rules and identifying when the first pattern of movement corresponds within threshold variations with a first historic movement pattern of the set of at least one historic movement patterns; and causing a notification to be communicated to a central evaluation system when the first pattern of movement of the first consumer item is consistent with the first historic movement pattern.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail system to detect suspicious movement patterns within a retail shopping facility, comprising:
   an array of multiple camera systems;
   an array of multiple radio frequency identification (RFID) readers; and
   a shopping facility evaluation system communicatively coupled with a database of historic movement patterns, wherein the evaluation system comprises an evaluation control circuit that in implementing code stored on memory is configured to:
   receive RFID tag read information from two or more of the RFID readers of a first RFID tag exclusively associated with a first consumer item of numerous different RFID tags each exclusively associated with different consumer items within a shopping facility, wherein the first consumer item is one of a plurality of consumer items of a first product;
   access a first set of rules that are applied to identify movement patterns of consumer items;

apply the first set of rules to identify a first pattern of movement of the first RFID tag as the first RFID tag is moved through at least a portion of the shopping facility;
access, within the database of historic movement patterns, a set of at least one historic movement patterns specific to the first product and each defining a pattern of movement corresponding to known suspicious activity;
cause a modification of a frequency of reads of the RFID tag information;
continue to receive the RFID tag read information of the first RFID tag at the modified frequency of reads;
access a second set of rules that are applied to evaluate movement patterns; and
apply the second set of rules and identify when the first pattern of movement corresponds within threshold variations with a first historic movement pattern of the set of at least one historic movement patterns.

2. The system of claim 1, wherein the evaluation system further identifies an origin location of the first RFID tag, and in identifying the first historic movement further identifies the first historic movement pattern having a pattern origin within a threshold distance of the origin location of the first RFID tag.

3. The system of claim 1, further comprising:
a video processing system communicatively coupled with the evaluation system, wherein the video processing system is configured to: obtain and apply a third set of rules to process first video content corresponding to the first pattern of movement to identify an object moving the first RFID tag along the first pattern of movement; process second video content captured prior in time to a time period when the first pattern of movement occurred; and generate a mapped route of the object as it traveled through the shopping facility.

4. The system of claim 3, wherein the video processing system is further configured to accumulate video content of the object while at the shopping facility and prior to the time period when the first pattern of movement occurred.

5. The system of claim 4, further comprising:
a central evaluation system communicatively coupled with the evaluation system of each of multiple shopping facilities, wherein the central evaluation system comprises a central evaluation control circuit configured to direct a notification, the mapped route, and the accumulated video content to an evaluator worker to be utilized by the evaluator worker in confirming the suspicious activity.

6. The system of claim 5, wherein the evaluation system is further configured to receive an alert from the central evaluation system confirming suspicious activity; and notify at least one worker at the shopping facility while the first consumer item and the object are still in the shopping facility.

7. The system of claim 1, wherein the evaluation system is configured to obtain a third set of rules to continue to track movement of identified objects; apply the third set of rules to continue to track additional movement of the first consumer item following the identification that the first pattern of movement of the first consumer item is consistent with the first historic movement pattern; accumulate video content that includes the additional movement of the first consumer item as the first consumer item is moved over time.

8. The system of claim 1, further comprising:
a video processing system communicatively coupled with the evaluation system and configured to: obtain a third set of rules to identify an object within video content; apply the third set of rules to process video content corresponding to the first pattern of movement to identify an object moving the first RFID tag along the first pattern of movement; obtain a fourth set of rules to identify potential accomplices; apply the fourth set of rules to identify when an accomplice object is associated with the identified object; and identify when movement of the accomplice object corresponds within threshold variations with a first accomplice historic movement pattern of the set of at least one historic movement patterns.

9. The system of claim 1, further comprising:
a video processing system communicatively coupled with the evaluation system, wherein the video processing system is configured to:
obtain and apply a third set of rules to process first video content corresponding in time to a first period of time when the first consumer item is moved along the first pattern of movement;
identify, based on the processing of the first video content, an object moving the first RFID tag along the first pattern of movement;
process second video content captured in time after the first time period; and
generate a mapped route of movement of the object as it traveled through the shopping facility; and
wherein the evaluation system is further configured to receive the mapped route of the movement of the object; detect, based on the RFID tag read information and the mapped route of the movement of the object, a separation between the first RFID tag and the object.

10. The system of claim 1, wherein the evaluation control circuit is further configured to cause one or more RFID readers of the two or more RFID readers to cause the first RFID tag to emit information consistent with the modification of the frequency of reads of the RFID tag information.

11. A method of detecting suspicious movement patterns within a retail shopping facility, comprising:
by a control circuit, operably coupled to at least one memory and implementing code stored on the memory, configured to:
receive, at an evaluation system of a retail shopping facility, RFID tag read information from two or more RFID readers of a first RFID tag exclusively associated with a first consumer item of numerous different RFID tags each exclusively associated with different consumer items within the shopping facility, wherein the first consumer item is one of a plurality of consumer items of a first product;
accessing a first set of rules that are applied to identify movement patterns of consumer items;
using the first set of rules and identifying a first pattern of movement of the first RFID tag as the first RFID tag is moved through at least a portion of the shopping facility;
accessing, within a database of historic movement patterns, a set of at least one historic movement patterns specific to the first consumer item and each defining a pattern of movement corresponding to known suspicious activity;
causing a modification of a frequency of reads of the RFID tag information, and continuing to receive the RFID tag read information of the first RFID tag at the modified frequency reads;
accessing a second set of rules that are applied to evaluate movement patterns; and using the second set of rules and identifying when the first pattern of movement corresponds within threshold variations with a first historic movement pattern of the set of at least one historic movement patterns.

12. The method of claim 11, further comprising:
identifying an origin location of the first RFID tag; and
wherein the identifying the first historic movement pattern comprises identifying the first historic movement pattern having a pattern origin within a threshold distance of the origin location of the first RFID tag.

13. The method of claim 11, further comprising:
obtaining a third set of rules to identify an object within video content;
applying, by a video processing system, the third set of rules to process first video content corresponding to the first pattern of movement to identify an object moving the first RFID tag along the first pattern of movement;
processing second video content captured prior in time to a time period when the first pattern of movement occurred; and
generating a mapped route of the object as it traveled through the shopping facility.

14. The method of claim 13, further comprising:
accumulating video content of the object while at the shopping facility and prior to the time period when the first pattern of movement occurred.

15. The method of claim 14, further comprising:
directing a notification, the mapped route, and the accumulated video content to an evaluator worker to be utilized by the evaluator worker in confirming the suspicious activity.

16. The method of claim 15, further comprising:
receiving an alert from the central evaluation system confirming suspicious activity; and
notifying at least one worker at the shopping facility while the first consumer item and the object are still in the shopping facility.

17. The method of claim 11, further comprising:
applying a third set of rules to continue to track additional movement of the first consumer item following the identification that the first pattern of movement of the first consumer item is consistent with the first historic movement pattern;
accumulating video content that includes the additional movement of the first consumer item as the first consumer item is moved over time.

18. The method of claim 11, further comprising:
obtaining a third set of rules to identify an object within video content;
applying the third set of rules to process video content corresponding to the first pattern of movement to identify an object moving the first RFID tag along the first pattern of movement;
obtaining a fourth set of rules to identify potential accomplices;
using the fourth set of rules and identifying when an accomplice object is associated with the identified object; and
identifying when movement of the accomplice object corresponds within threshold variations with a first accomplice historic movement pattern of the set of at least one historic movement pattern.

19. The method of claim 11, further comprising:
a video processing system communicatively coupled with the evaluation system, wherein the video processing system is configured to:
obtaining and applying a third set of rules to process first video content corresponding in time to a first period of time when the first consumer item is moved along the first pattern of movement;
identifying, based on the processing of the first video content, an object moving the first RFID tag along the first pattern of movement;
processing second video content captured in time after the first time period;
generating a mapped route of movement of the object as it traveled through the shopping facility;
receiving the mapped route of the movement of the object;
detecting, based on the RFID tag read information and the mapped route of the movement of the object, a separation between the first RFID tag and the object.

20. The method of claim 11, further comprising:
causing one or more RFID readers of the two or more RFID readers to cause the first RFID tag to emit information consistent with the modification of the frequency of reads of the RFID tag information.

* * * * *